US009148938B2

(12) United States Patent (10) Patent No.: US 9,148,938 B2
Safar (45) Date of Patent: Sep. 29, 2015

(54) SMART MULTI-DIMENSIONAL LIGHT CELL ARRANGEMENT

(71) Applicant: Samir Hanna Safar, San Diego, CA (US)

(72) Inventor: Samir Hanna Safar, San Diego, CA (US)

(*) Notice: Subject to any disclaimer, the term of this patent is extended or adjusted under 35 U.S.C. 154(b) by 5 days.

(21) Appl. No.: 14/287,091

(22) Filed: May 26, 2014

(65) Prior Publication Data

US 2014/0252986 A1 Sep. 11, 2014

Related U.S. Application Data

(63) Continuation-in-part of application No. 13/439,024, filed on Apr. 4, 2012, now Pat. No. 8,770,790.

(51) Int. Cl.
| | |
|---|---|
| *H05B 37/02* | (2006.01) |
| *F21V 23/04* | (2006.01) |
| *F21S 2/00* | (2006.01) |
| *F21V 21/08* | (2006.01) |
| *F21V 21/005* | (2006.01) |
| *F21Y 101/02* | (2006.01) |
| *F21Y 105/00* | (2006.01) |

(52) U.S. Cl.
CPC ............ *H05B 37/0272* (2013.01); *F21S 2/005* (2013.01); *F21V 21/0808* (2013.01); *F21V 21/0832* (2013.01); *F21V 23/0435* (2013.01); *F21V 21/005* (2013.01); *F21Y 2101/02* (2013.01); *F21Y 2105/006* (2013.01)

(58) Field of Classification Search
CPC .... H05B 37/032; H05B 37/036; H05B 37/02; H05B 37/0245; H05B 37/0272; F21S 2/005; F21V 21/0808; F21V 21/0832; F21V 21/005; F21V 23/00; F21V 23/003; F21V 23/007; F21V 23/0435; F21Y 2101/02; F21Y 2105/006
See application file for complete search history.

(56) References Cited

U.S. PATENT DOCUMENTS

| | | | | |
|---|---|---|---|---|
| 4,138,620 | A * | 2/1979 | Dickson | 313/1 |
| 4,173,035 | A * | 10/1979 | Hoyt | 362/249.04 |
| 4,204,273 | A * | 5/1980 | Goldberg | 362/219 |
| 4,761,720 | A * | 8/1988 | Solow | 362/235 |
| 4,899,086 | A * | 2/1990 | Hirata et al. | 315/169.3 |
| 5,336,345 | A * | 8/1994 | Gustafson et al. | 156/67 |
| 5,485,355 | A * | 1/1996 | Voskoboinik et al. | 362/84 |
| 5,552,679 | A * | 9/1996 | Murasko | 315/169.3 |
| 5,976,613 | A * | 11/1999 | Janusauskas | 427/66 |
| 6,849,869 | B1 * | 2/2005 | O'Regan et al. | 257/40 |
| 7,109,661 | B2 * | 9/2006 | Watanabe et al. | 315/169.3 |
| 7,354,785 | B2 * | 4/2008 | Kabay et al. | 438/47 |
| 2001/0043472 | A1 * | 11/2001 | Gibboney, Jr. | 362/240 |
| 2002/0145873 | A1 * | 10/2002 | Rahman | 362/252 |
| 2006/0244377 | A1 * | 11/2006 | Mushtaev | 313/511 |
| 2007/0210321 | A1 * | 9/2007 | Satou | 257/79 |
| 2009/0296395 | A1 * | 12/2009 | Tarko et al. | 362/249.06 |
| 2010/0061089 | A1 * | 3/2010 | Lin et al. | 362/218 |
| 2012/0206050 | A1 * | 8/2012 | Spero | 315/152 |
| 2014/0015415 | A1 * | 1/2014 | Lim et al. | 315/131 |

(Continued)

*Primary Examiner* — Bao Q Truong
(74) *Attorney, Agent, or Firm* — Samir Hanna Safar

(57) ABSTRACT

The present invention relates to a novel arrangement of light cells on a flexible or solid background into a smart multi-dimensional light source capable of unlimited configuration, which comprises of a mother cell that is connected to one source of electrical power and gets charged, subsequently charging all the other light cells and thus illuminating the entire light source with unlimited configuration, and which is capable of being wirelessly switched on or off by means of a smart phone device.

9 Claims, 3 Drawing Sheets

(56) References Cited

U.S. PATENT DOCUMENTS

2014/0203710 A1* 7/2014 Li .................................. 315/129
2014/0239816 A1* 8/2014 Lee et al. ....................... 315/130
2014/0239852 A1* 8/2014 Kim et al. ...................... 315/312

* cited by examiner

SMART MULTI-DIMENSIONAL LIGHT CELL ARRANGEMENT

CROSS-REFERENCE TO RELATED APPLICATIONS

The present application is a continuation-in-part of currently pending U.S. patent application Ser. No. 13/439,024 filed on Apr. 4, 2012, which is hereby incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of light sources and more particularly relates to a novel arrangement of light cells into a multi-dimensional light source arranged in a continuous manner, connected to a single power source and capable of unlimited configuration, capable of being controlled by wirelessly by means such as a mobile phone.

BACKGROUND OF THE INVENTION

Light sources such as light emitting diodes (LEDs), Electroluminescence (EL), and organic light-emitting diodes (OLEDs) have paved the way for energy efficient lighting means. Oleg Vladimirovich Losev independently reported on the creation of an LED in 1927. Rubin Braunstein of the Radio Corporation of America reported on infrared emission from gallium arsenide (GaAs) and other semiconductor alloys in 1955. Braunstein observed infrared emission generated by simple diode structures using gallium antimonide (GaSb), GaAs, indium phosphide (InP), and silicon-germanium (SiGe) alloys at room temperature and at 77 K.

In 1961, American experimenters Robert Biard and Gary Pittman working at Texas Instruments, found that GaAs emitted infrared radiation when electric current was applied and received the patent for the infrared LED. The first practical visible spectrum (red) LED was developed in 1962 by Nick Holonyak Jr., while working at General Electric Company. In 1976, T. P. Pearsall created the first high brightness, high efficiency LEDs for optical fiber telecommunications by inventing new semiconductor materials specifically adapted to optical fiber transmission wavelengths.

The first commercial LEDs were commonly used as replacements for incandescent and neon indicator lamps, and in seven-segment displays, first in expensive equipment such as laboratory and electronics test equipment, then later in such appliances as TVs, radios, telephones, calculators, and even watches (see list of signal applications). These red LEDs were bright enough only for use as indicators, as the light output was not enough to illuminate an area. The invention and development of the high power white light LED led to use for illumination.

Electroluminescence (EL) or the generation of light by the electrical excitation of light emitting phosphors has been around for many years. Electroluminescence was first observed in silicon carbide (SiC) by Captain Henry Joseph Round in 1907 who reported that a yellow light was produced when a current was passed through a silicon carbide detector. The first thin-film EL structures were fabricated in the late 1950s by Vlasenko and Popkov who observed that luminance increased markedly in EL devices when they used a thin film of Zinc Sulfide doped with Manganese (ZnS:Mn). Luminance was much higher in thin film EL (TFEL) devices than in those using powdered substances. Such devices however were still too unreliable for commercial use.

Organic light-emitting diodes (OLEDs) are transparent when turned off the devices could even be installed as windows or skylights to mimic the feel of natural light after dark, or to serve as the ultimate inconspicuous flat-panel television. In 2006 scientists studying OLEDs made a critical leap from single-color displays to a highly efficient and long lived natural light source.

Despite various improvements and progress in the field, some of the major obstacles that still exist to effective use of light sources such as LEDs, ELs and OLEDs are problems of configuration in novel sizes, shapes and patterns, problems in easy connectivity between different light segments, low light output, susceptibility to moisture, problems of easy installation without many peripherals, cost effective manufacture, maximum utilization of minimal power sources and short life.

Accordingly, improvements are needed in the existing methods and structures that negate the above shortcomings in the existing systems. The relevant prior art methods, which will deal with light sources, are as follows.

U.S. Pat. No. 4,138,620 describes a multi panel electroluminescent panel assembly in which an area extending over several panels may be uniformly illuminated by light produced by the panels, and over which non-illuminated areas, stripes or the like resulting from electrode contracts are eliminated. Each panel is constructed such that the light produced per unit area is substantially uniform throughout the panel, including that from an area immediately adjacent at least one edge thereof.

U.S. Pat. No. 4,173,035 describes a flexible lighting strip including a circuit of modular construction formed thereon, light emitting diodes connected to said circuit, and the circuit being connectable to control circuitry which provides selected energization to said circuit and the light emitting diodes for effecting a moving light.

U.S. Pat. No. 4,204,273 describes a flexible conductor of strip configuration including a pair of copper conductors laminated between a pair of insulating material layers. Illuminating comprising a plurality of miniature or sub-miniature light bulbs assembled in a longitudinal array along a preferably flexible and flat conductor.

U.S. Pat. No. 4,899,086 describes an electroluminescence light emission apparatus based on a switch circuit formed of a switch element and a thyristor connected in series across a DC power source. Electroluminescence light emission apparatus having a simple configuration and a low level of power consumption, while providing a satisfactory level of emitted light brightness and utilizes an electroluminescence element functioning to emit light in response to applied voltage pulses.

U.S. Pat. No. 5,336,345 describes an elongate electroluminescent light strip. An electroluminescent light element which has a semitransparent film is encapsulated in a moisture impervious material. A process for extruding such a strip is also provided.

U.S. Pat. No. 5,485,355 describes a cable like electroluminescent light source comprises at least two electrodes mutually disposed in such a way as to crate between them an electric field when a voltage is applied to them; at least one type of pulverulent electroluminophor dispersed in a dielectric binder and disposed in such proximity to the electrodes as to be effectively excited by the electric fields when created and to emit light of a specific color, and a transparent polymer sheath encasing the electrodes and the electroluminophor.

U.S. Pat. No. 5,552,679 describes an illumination system with a panel that is capable of producing electroluminescence function of the panel. An illumination system can emit electroluminescence light as well as reflect incident light received from an outside light source. A layer of phosphor is excited by a power source, and a reflective layer disposed on top of the phosphor layer reflects.

U.S. Pat. No. 5,976,613 describes a flexible thick film electroluminescent lamp and method of construction in which a single non-hygroscopic binder is used for all layers thereby reducing delamination as a result of temperature changes and the susceptibility to moisture. Thick film electroluminescent lamps comprise a phosphor between an optically transparent front electrode layer, and a back electrode layer, all covered by protective electrode layer. The two electrodes are generally planar layers, but may be grids of electrically conductive material disposed at right angles to each other so that the phosphor at selected grid coordinates can be excited.

U.S. Pat. No. 6,849,869 describes the luminous efficiency and radiance of light emitting diodes (LEDs) fabricated with conjugated organic polymer layers.

U.S. Pat. No. 7,109,661 describes an electroluminescent light emission system having electroluminescent light emitting layer containing electroluminescent light emitting elements. The AC electric field forming material on the one surface side enables an AC electric field to be generated in the electroluminescent light emitting layer with an AC volt age applied between the first electrode layer and the second electrode layer.

U.S. Pat. No. 7,354,785 describes an electroluminescent device having light emitting layer containing phosphor particles which protrude from a light emitting layer, and an electrode layer which conforms to the protrusions. Methods of constructing a lamp using a temperature above the softening temperature of the insulating layer of the device are also disclosed.

US Patent Publication no. 20010043472 describes a ribbon light string is formed from a reinforced ribbon carrying a light string. The ribbon may be reinforced with peripheral reinforcing wires so that it may be shaped in decorative ways.

US Patent Publication no. 20020145873 describes a ribbon light assembly comprising a substrate and at least one light string releasably intertwined with the substrate. Each light string is formed of a plurality of lamp sockets and a plurality of lamp sockets and a plurality of wires connecting the lamp sockets. Each of the lamp sockets is substantially disposed on one substrate surface, and each of the wires is substantially disposed on an opposite surface. An opposite surface which receives at one element thereto, maintain the lamp sockets in a fixed pattern on the substrate.

US Patent Publication no. 20060244377 describes an electroluminescent light source has an elongated insulating transparent polymer sheaths having longitudinal axis of the sheath and connectable to a power source; a plurality of elongate electroluminescent layers partially surrounding one of the electrodes. Each electrodes having outer surface is partially surrounded by a respective one of the electroluminescent layers and being provided with a light reflecting coating.

US Patent Publication no. 20070210321 describes an edge light-emitting device having, on a light permeable substrate, a stacked structure including a pair of electrodes and at least one light emitting layer interposed between the electrodes, in which light emission is taken-out from a light emitting edge other than the light emitting edge of the stacked structure.

US Patent Publication no. 20090296395 describes that the present invention provides a light strip comprises an elongate core layer of insulating material having a plurality of light mounting apertures extending through the core layer. A light strip comprising of light emitting diodes connected at longitudinally spaced positions between a pair of longitudinally extending conductive elements of forming the light strip. A core layer spans in the longitudinal direction adjacent each one of the two opposed faces of the elongate core layer to enclose opposing ends of the light mounting apertures with the light emitting diodes therein.

US Patent Publication no. 2010057584 describes a light emitting strip structure with light guiding effect, which is hallow light guide strip body made of transparent material. A light guide strip body is formed with an axial internal chamber. Multiple recessed/raised sections are formed on a wall of the internal chamber for deflecting or reflecting light projected into the internal chamber from a light source.

US Patent Publication no. 20100061089 describes a flexible light strip includes an electrical-conductive layer, a plurality of light emitting units, an insulating layer and a heat-conducting layer. The light emitting units are adhered to the electrical-conductive layer and are electrically connected thereto. The insulating layer is overlapped on one surface of the electrical-conductive layer. The insulating layer is provided with a plurality of through holes for allowing the light emitting units to pass through. The heat conductive layer is adhered on the electrical-conductive layer.

However the purpose and methodology of all the above inventions that are part of prior art do not envisage the unique embodiment of several light cells that are in LED, or Electroluminescence (EL) or any other efficient light source that constitute a multi-dimensional light source consisting of a mother cell and several sister cells as required that can be arranged in a continuous manner and is capable of unlimited configuration.

In a co-pending application of the inventor, embodiments describing continuous arrangement of light cells on a flexible substrate are disclosed, however such an embodiment does not have provision to control the switching on and switching off of light cells remotely using a smart device by a wireless means. Thus the present invention endeavors to provide a system of light cells that can be effectively used without using PCB motherboard, hard connection electrical wires or welding that could be placed on an adhesive tape, cloth, or hard surface of unlimited dimensions and powered using a single power source. Further, such a system of light cells can be remotely controlled by switching on or switching off particular light cells using a software application installed on a smart device such as a smart phone by wireless means.

The scope of the invention is to be determined by the terminology of the following description, claims, drawings and the legal equivalents thereof.

SUMMARY OF THE INVENTION

The present invention may be summarized, at least in part, with reference to its objects.

It is therefore a primary objective of the present invention to provide a novel arrangement of light cells that can be arranged into a multi-dimensional light source in a continuous manner with one mother cell and as many sister cells as required connected to the mother cell, wherein it is possible to switch on or switch off specific sister cells remotely by means of a software application installed on a smart device such as a smart phone.

Another objective of the present invention is to provide a novel arrangement of light cells that can be connected to a single power source and can be wirelessly controlled to achieve desired visual effect by means of a smart device such as a smart mobile phone device.

Another objective of the present invention is to provide a novel arrangement of light cells that requires no hard connectivity, electrical wires, PC Board, soldering or any other conventional electrical wiring and that can be used for household and commercial lighting, all kinds of holiday decorations, arts and commercial advertising, by wirelessly controlling the switching on and switching off of the light cells, or by selectively lighting specific light cells from a given configuration of light cell arrangement.

The invention described herein thus comprises a novel arrangement of light cells that are in LED or Electroluminescence (EL) or any other efficient light source and are placed adjacent to each other and touching each other to form a continuous and multi dimensional light source without using PCB motherboard, hard connection electrical wires or welding. The present invention can be placed on an adhesive tape, cloth, hard surface or any adhesive tape for unlimited dimensions. A surface such as an adhesive tape containing the present invention can be cut at any length and place it to any part of the surface. When such cutting happens, the present invention does not need to have another source for every such tape and extra tools and materials, a single power source is sufficient.

Each light cell that is arranged in a continuous configuration to provide a multidimensional light source is also provided with a control module. The control module comprises of a Bluetooth module and a logic module. The Bluetooth module is electrically connected to the logic module. The smart phone device of the user is in wireless communication with the Bluetooth module provided in the control module of every light cell, be it a sister cell or the mother cell, by means of a smartphone based application ("app") present in a handheld wireless mobile communication device, such as a smartphone, or a wearable computing device.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

DETAILED DESCRIPTION OF THE INVENTION

Figure 1:
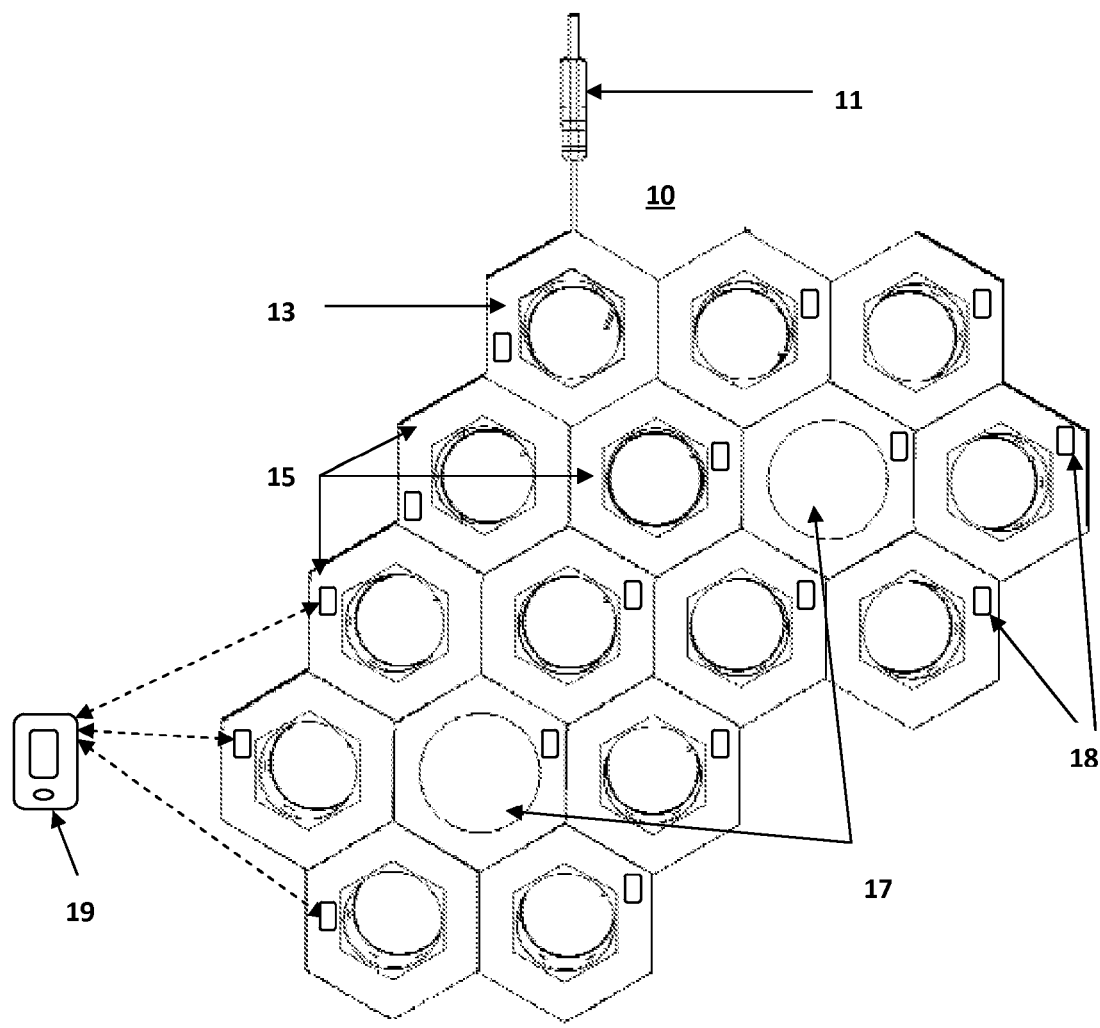
FIG. 1 is an illustrative diagram depicting the arrangement of light cells in one embodiment of the present invention which is in wireless communication with a smart phone device.

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

The present invention can be configured as follows:

As disclosed in currently co-pending patent application Ser. No. 13/439,024, which is herein incorporated by reference; a primary unit of the present invention that is electrically powered, is called the mother cell, comprising of a large ring, non-conductive material rings, a small ring, non-conductive material, any efficient light source including but not limited to an LED or Electroluminescence (EL), copper springs, an electrical wire, and a background holding material such as adhesive tape. The mother cell is the first cell that connects to power source. A large ring in a mother cell has non-conductive material ring and on both sides of the large ring. The large ring in a particular mother cell acts as a connector to any side of another mother cell. A large ring thus passes electrical current to the light source via the electrical wire. A small ring acts as a connector to any other mother cell and has non-conductive material on one side of the small ring. The small ring passes electrical current to the light source via an electrical wire. The copper springs in the present invention improve electrical connectivity among the various sister cells, and provides flexibility by facilitating bending between sister cells so that they can be arranged in various configurations not restricted to a straight line and including a spherical or other configuration.

This makes it possible to create diverse kinds of unconventional configurations to create a particular larger light pattern and further the light cell configuration need not be arranged on a conventional hard background surface but can be arranged on any flexible background material.

The mother cell connects to an AC or DC electrical source. From the mother cell, electrical power is transferred to the remaining cells called sister cells when they are connected to the mother cell. Miniature transformers, designated as "booster cells" ensure electrical current transfer to the sister light cells that are situated away from the mother cell.

The present invention aims to provide a "smart" light cell configuration wherein selective switching on or off or particular light cells among the continuous light cell arrangement is possible by wireless communication by the user. This is achieved by a software application present on a user's smart device that is in wireless communication with control modules provided on the light cells.

Short range communication technologies such as Near Field Communication and Bluetooth protocol as known in prior art are used to control the switching on and switching off of sister light cells or booster cells or the mother cell remotely.

According to a preferred embodiment of the present invention, each light cell (the mother cell and every sister cell) is provided with a control module further comprising of a Bluetooth module in wireless communication with software application present on a smart device and a logic module electrically connected to the Bluetooth module.

With reference to FIG. 1, a smart multi-dimensional light cell arrangement in accordance with the present invention has a smart device 19 and a light cell assembly 10 comprising of a plurality of light cells arranged continuously on a flexible substrate as described in currently co-pending patent application Ser. No. 13/439,024, wherein said light cell arrangement comprises of a plurality of sister cells and a mother cell. Each light cell, is provided with a control module comprising of a Bluetooth module that is electrically connected to a logic module. The logic module is further electrically connected to a light source such as an LED cell or electroluminescent EL cell or any other efficient light source.

The smart device 19 may be a smart phone or a tablet PC or a mobile computing device. In the present embodiment, the smart device 19 is a smart mobile phone. The smart device 19 is wirelessly connected to the Bluetooth module 18 of sister cells 15. 11 depicts the main power source which provides input power to mother cell 13. 17 denotes booster cells. In alternate embodiments, specific sister cells may be designated as "booster cells" in order to boost the voltage to clusters of distant sister cells to compensate for any voltage drop as the current travel to cells away from the mother cell. DC-DC booster cells (boost convertor or step up convertor) as known in the art may be employed for this purpose.

The smart device 19 transmits a wireless signal to the Bluetooth modules 18 of sister cells 15 so as to control the selected switching on or off of specific light cells to obtain a different illumination effect.

Figure 2:
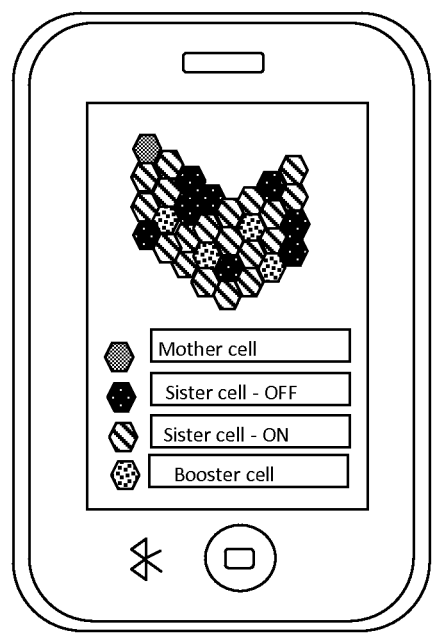
FIG. 2 is a diagram showing an embodiment of the present invention depicting a software application on a smart device.

In the current embodiment, the smart device is a smart phone. As depicted in FIG. 2, the smart device 19 has an app, wherein the continuous arrangement of the light cell assembly is depicted as a grid or matrix. A user can select specific light cells by touching their cell location as shown in the grid or arrangement displayed on the smart device screen. The user's touch events are interpreted as different commands and wirelessly communicated using a Bluetooth communication module residing on the smart device to the Bluetooth module on the respective light cells.

The Bluetooth communication module present in the app is configured to transmit and receive wireless signals. In the present embodiment, this module may be configured as a Bluetooth communication module transmitting and receiving Bluetooth signals or a Wi-Fi network module transmitting and receiving Wi-Fi signals.

The app is provided with functionalities such that specific user commands are generated based on type of user input. In one embodiment of the invention, the app conveys the address of the light cell and command to switch on or off the light cell.

In alternate embodiments, the app conveys commands to achieve different illumination effect such as blinking, or selectively switching on or off of specific colored light cells.

In alternate embodiments, the user input can be provided in the form of touch, voice, audio or music or gestures.

The user commands are transmitted to the Bluetooth communication module present in the smart device. The Bluetooth communication module converts the user control commands into a wireless command signal and transmits the wireless command signal. The user command input interface is displayed on the touch panel and displays multiple functions for users to select specific light cells arranged in the grid, as shown in FIG. 2.

Figure 3:
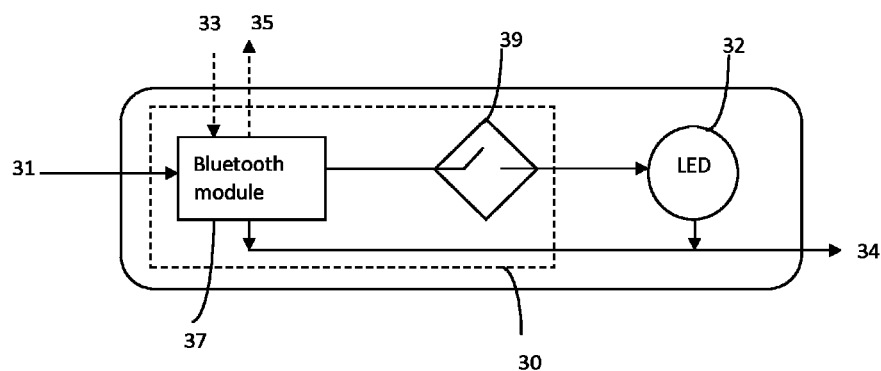
FIG. 3 is a schematic diagram depicting the modules provided on a sister cell.

Referring to FIG. 3, which is a schematic diagram depicting the operating modules provided on a sister cell. 30 is the control module comprising of Bluetooth module 37 and logic module 39, electrically connected to light source 32 such as an LED cell. 31 depicts the current flow in from a neighboring (adjoining) sister cell. 34 depicts the current flow out from the light source 32. 33 depict the flow of wireless communication signals to the Bluetooth module 37 from the paired Bluetooth communication module of the smart device. 35 depict the flow of wireless communication signals from the Bluetooth module 37 to the paired Bluetooth communication module of the smart device. Wireless communication between the smart device and the control module on the light cell may be achieved by transmitting and receiving Bluetooth signals or Wi-Fi signals over a wi-fi network.

The logic module 39 and serves to control the lighting of the light source 32 by switching on or off the current supply as per the command received from Bluetooth module 37. The logic module incorporates a switch that completes or breaks the circuit.

In alternate embodiments, the control module 30 may comprise of a combination of microcontroller units that are electronically connected to the Bluetooth connection module 31 to receive the user command transmitted from the smart device. This can be used to provide different functionalities such as switching on or off of sister cells based on address, switching on or off of sister cells based on color, switching on or off of sister cells based on time duration, blinking effect or dimming or varying the luminance to create a different visual effect.

In alternate embodiments, only specific sister cells are provided with the control module.

Figure 4:
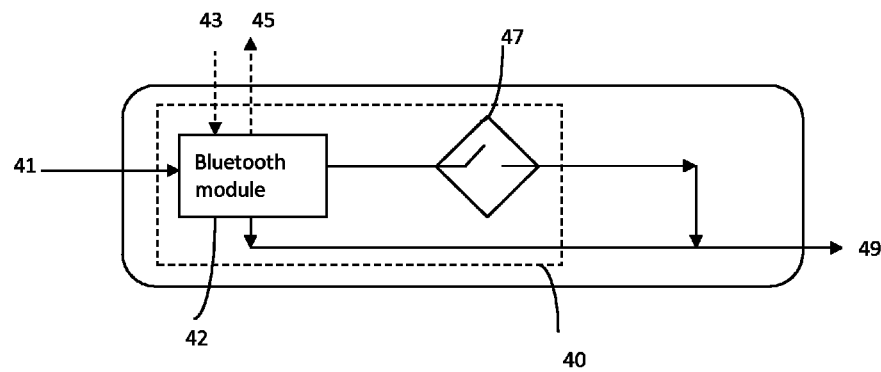
FIG. 4 is a schematic diagram depicting the modules provided on the mother cell.

Referring to FIG. 4, which is a schematic diagram depicting the operating modules provided on a mother cell. 40 is the control module comprising of a Bluetooth module 42 and a first logic module 46 and a second logic module 47, all of which are electrically connected. The second logic module 47 is electrically connected to a light source 48 such as an LED cell. 41 depicts the current flow in from the power source. 49 depicts the current flow out from the mother cell. Switching off the mother cell via the app on the smart device will result in switching off of the entire light cell assembly. This is achieved by breaking the circuit by means of first logic module 46. The second logic module 47 controls the switching on or off of the light source 48. 43 depicts the flow of wireless communication signals to the Bluetooth module 42 from the paired Bluetooth communication module of the smart device. 45 depicts the flow of wireless communication signals from the Bluetooth module 42 to the paired Bluetooth communication module of the smart device. Wireless communication between the smart device and the control module on the light cell may be achieved by transmitting and receiving Bluetooth signals or Wi-Fi signals over a wi-fi network. The logic module incorporates a switch that completes or breaks the circuit.

In an alternate embodiment, the mother cell does not have a light source and the control module comprises of a Bluetooth module and a first logic module, which are electrically connected. Such an embodiment will serve the function of a single control to switch on or off the entire light cell assembly.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

In this application, the terminology 'embodiment' can be used to describe any aspect, feature, process or step, any combination thereof, and/or any portion thereof, etc.

The present invention is a smart multi-dimensional light cell assembly comprising a primary light cell unit called a mother cell, ancilliary light cell units called sisters cells, a background holding material, a control module electrically connected to said mother cell and having a Bluetooth module and a logic module, a control module electrically connected to said sister cells and having a Bluetooth module and a logic module and a smart device wirelessly connected to said control modules for selective switching on and off of said mother cell and said sister cells according to user input received via a mobile software application residing on the smart device. The entire light cell assembly is provided on the background holding material, which is a flexible substrate in a continuous arrangement.

In another embodiment of the present invention, the control module is provided only on specific light cells.

In an alternate embodiment, the mobile software application residing on the smart device is capable of associating user input in the form of touch, audio or gestures.

In alternate embodiments, the smart device may be a smart phone, a mobile phone, a cellular phone, a personal digital assistant (PDA), a GPS device, a smartbook, a netbook, a notebook, an ultra-mobile personal computer, a wireless computing device or a wearable computing device.

In alternate embodiment, specific light cells can be switched on or off depending on location of the light cells in the assembly, color of the light cells, duration for switching on or off, variance of the lighting intensity, illumination effect.

Although the present invention has been described illustrating Bluetooth protocol as wireless communication means, Zigbee, Near Field Communication and Radio Frequency Identification means may also be used to achieve the desired results.

In alternate embodiments, the app has additional functionality for user authentication to ensure that only authorized users can control the remote switching on or off the light cells.

In yet another embodiment, the software application residing on the smart device can receive feedback on the functioning of a specific light cell and whether it needs to be changed. This is used for monitoring and maintenance purposes.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

These and other objects of the present invention are further elaborated in the detailed description of the invention. These objects should be construed to be merely illustrative of some of the more prominent features and applications of the invention and not as to limit the scope of the invention. Applying or modifying the disclosed invention in a different manner can attain many other beneficial results or modifying the invention as will be described. Accordingly, referring to the following drawings and detailed description may have a complete understanding of the invention.

I claim:

1. A smart multi-dimensional light cell assembly comprising:
    a primary light cell unit called a mother cell;
    a plurality of ancillary light cell units called sisters cells;
    a background holding material;
    a control module electrically connected to said mother cell and having a Bluetooth module and a logic module;
    a control module electrically connected to said sister cells and having a Bluetooth module and a logic module; and
    a smart device wirelessly connected to said control modules for selective switching on and off of said mother cell and said sister cells according to user input received via a mobile software application residing on the smart device,
    characterized in that the mother cell is electrically connected to an AC or DC electrical power source and to the adjoining sister cells,
    the mother cell and the plurality of sister cells being provided on the background holding material in a continuous arrangement.

2. The smart multi-dimensional light cell assembly as claimed in claim 1 wherein the control module is provided only on specific light cells.

3. The smart multi-dimensional light cell assembly as claimed in claim 1 wherein the mobile software application residing on the smart device is capable of associating user input in the form of touch, audio or gestures.

4. The smart multi-dimensional light cell assembly as claimed in claim 1 wherein the smart device is selected from a group consisting of a smart phone, a mobile phone, a cellular phone, a personal digital assistant (PDA), a GPS device, a smartbook, a netbook, a notebook, an ultra-mobile personal computer and a wearable computing device.

5. The smart multi-dimensional light cell assembly as claimed in claim 1 wherein specific light cells can be switched on or off depending on location of the light cells in the assembly, color of the light cells, duration for switching on or off, variance of the lighting intensity, illumination effect.

6. The smart multi-dimensional light cell assembly as claimed in claim 1 wherein the wireless communication means between the smart device and the control modules present on the light cells is selected from a group consisting of Bluetooth, Zigbee, Near Field Communication and Radio Frequency Identification means.

7. The smart multi-dimensional light cell assembly as claimed in claim 1 wherein specific sister cells are designated as booster cells.

8. The smart multi-dimensional light cell assembly as claimed in claim 1 wherein only authorized users can control the remote switching on or off the light cells.

9. The smart multi-dimensional light cell assembly as claimed in claim 1 wherein the software application residing on the smart device is capable of receiving feedback on the functioning of a specific light cell for monitoring and maintenance.

* * * * *